United States Patent [19]
Fellows

[11] Patent Number: 5,453,061
[45] Date of Patent: Sep. 26, 1995

[54] CONTINUOUSLY-VARIABLE RATIO TRANSMISSION OF THE TOROIDAL RACE ROLLING TRACTION TYPE

[75] Inventor: Thomas G. Fellows, Barnet, England

[73] Assignee: Torotrak (Development) Limited, England

[21] Appl. No.: 75,498

[22] PCT Filed: Dec. 10, 1991

[86] PCT No.: PCT/GB91/02184
§ 371 Date: Jul. 14, 1993
§ 102(e) Date: Jul. 14, 1993

[87] PCT Pub. No.: WO92/10697
PCT Pub. Date: Jun. 25, 1992

[30] Foreign Application Priority Data

Dec. 11, 1990 [GB] United Kingdom ............ 9026830

[51] Int. Cl.[6] .................. F16H 15/38; F16H 3/72
[52] U.S. Cl. .......................... 475/215; 475/216
[58] Field of Search ............... 475/215, 216, 475/217

[56] References Cited

U.S. PATENT DOCUMENTS 3,106,855  10/1963  Reichenbaecher.
4,768,398   9/1988  Greenwood ............... 475/216
4,885,955  12/1989  Kraus ........................ 475/216

FOREIGN PATENT DOCUMENTS

| 0078124 | 5/1983 | European Pat. Off. |
| 0177240 | 4/1986 | European Pat. Off. |
| 0389908 | 10/1990 | European Pat. Off. |
| 1078791 | 8/1967 | United Kingdom |
| 2150240 | 6/1985 | United Kingdom |
| 9005864 | 5/1990 | WIPO |

Primary Examiner—Charles A. Marmor
Assistant Examiner—Sherry Lynn Estremsky
Attorney, Agent, or Firm—Davis, Bujold & Streck

[57] ABSTRACT

A continuously-variable-ratio transmission (CVT) of the toroidal-race rolling-traction type, capable of operating in "low" and "high" regimes with synchronous change between those regimes, and including a variator (3)—that is to say a ratio-varying component—and an associated gearing set (2) of which the components are capable of being set in different combinations for the high and low regimes, in which the output of the gearing is connectable to the output (1) of the CVT as a whole, and the gearing has first (25) and second (29) inputs connected with the variator output (19) and engine output (5) respectively, and in which in low regime the gearing is set to recirculate power and so deliver to its output a power equal to the difference between its two input powers, whereas in high regime it is set to as to split the power flow and to deliver to its output a power representing the sum of the powers at its two inputs.

16 Claims, 1 Drawing Sheet

CONTINUOUSLY-VARIABLE RATIO TRANSMISSION OF THE TOROIDAL RACE ROLLING TRACTION TYPE This invention relates to continuously-variable-ratio transmissions (CVT's) of the toroidal-race rolling-traction type. It relates in particular to CVT's of this type in which a ratio-varying component (variator) and a gearing combination are arranged in that sequence, between an engine and the output of the CVT, in which the gearing combination is driven by the outputs both of the engine and of the variator, and in which the gearing combination is capable of two different settings so that the CVT is capable of working in two different "regimes", thus extending the effective ratio range of the CVT. Typically in one regime and assuming constant engine speed, a full sweep of the ratio range of the variator from one extreme to the other will result in the CVT output speed beginning at a maximum reverse value, reducing to zero speed (a condition known in the art as "geared neutral" or "geared idle") and then rotating in the forward sense and with increasing speed, reaching a low value of forward speed when the opposite extreme of the variator range is reached. If ratios are appropriately chosen it will then be possible to change the setting of the gearing combination, so that the CVT changes from one regime to the other, in a so-called synchronous manner, that is to say without instantaneous change of the speed of rotation of the CVT output. The CVT is now said to be in high regime, and if the variator is progressed back to the original end of its ratio range the forward speed of the CVT output increases steadily to maximum value.

BACKGROUND OF THE INVENTION

Examples of such two-regime CVT's of the toroidal-race rolling-traction type are to be found described in Patent Specification GB-A-1078791, GB-B-2150240 and many other prior publications. It has been a common feature of most such known CVT's that in the first or low regime, the gearing combination typically — of epicyclic type—has been used in conjunction with the variator as an output side or downstream shunt: in this regime power has recirculated, and the variator output has subtracted speed from its engine-driven input. In contrast in the second or high regime, there has in effect been a direct driving connection between the engine and the CVT output: the variator has taken full engine power, and the output range of the transmission has been the same as that of the variator.

In a variator which reverses the direction of rotation between input and output, the torque reaction (on the casing) will be the sum of the input and output torques. The tractive forces between the discs and rollers are proportional to the torque reaction. The ratio between tractive force and normal force between each disc and roller, commonly known in the art as the "design traction coefficient", is usually fixed by the layout of the variator. The normal force determines the contact stresses and therefore the size of the variator for a specified fatigue life. For any given operating condition size is approximately proportional to the cube root of the normal force, i.e. the cube root of the torque reaction. It is therefore advantageous to reduce torque reactions as far as possible.

If, for example, a variator with a ratio range from 0.5:1 to 2.0:1 is connected in high ratio to an input producing 100 Nm of torque, the torque reactions would range from 300 Nm at the low output speed end of the range to 150 Nm at the high end. The size of a variator will be influenced by its duty cycle, i.e. the time spent at full and part load and the time spent at each ratio. In most road vehicles little time is spent in low regime. Hard acceleration or hill climbing in high regime will tend to utilize low variator ratios at large engine torques. Benefits in size and weight (size cubed) can therefore be achieved by reducing the maximum torque reaction which occurs in high regime at the low end of the variator ratio range.

SUMMARY OF THE INVENTION

The present invention arises from appreciating the possibility of reducing the maximum torque reaction in high regime within the variator of a two-regime CVT by avoiding direct drive in high regime, and instead using a form of gearing shunt in that regime as well as in low regime. More particularly, the typically epicyclic gearing combination downstream of the variator is capable of a low regime setting in which it recirculates power, and an alternative high regime setting in which it "splits" the power flow from the engine to the output. By limiting the fraction of full power passing directly through the variator, the invention thus offers the prospect of a variator with components of smaller size than would have been necessary if direct drive had been used, and economy of design may be achieved by maximising the number of gearing components that are used in both regimes, and minimising the number that are used in only one regime.

The invention is defined by the claims, the contents of which are to be read as included within the disclosure of this specification, and includes a CVT as described with reference to the accompanying diagrammatic drawing.

BRIEF DESCRIPTION OF THE DRAWING

An embodiment of the invention will now be described by way of example with reference to FIG. 1, which shows some components of a CVT schematically and others in axial section.

DESCRIPTION OF THE PREFERRED EMBODIMENT(S)

Figure 1:
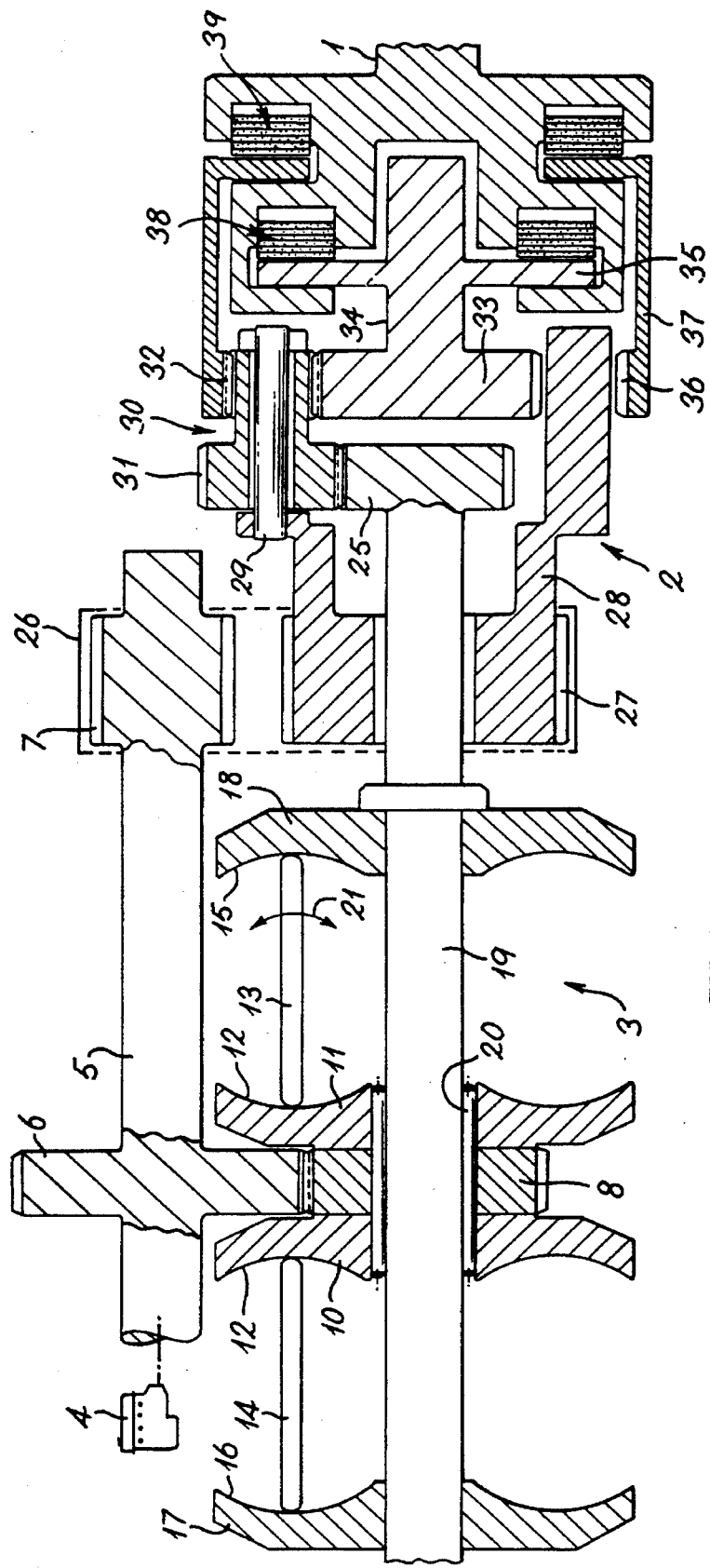

A CVT having an output 1 and an epicyclic gearing combination 2 and toroidal-race variator 3 is driven by an engine 4. The output shaft 5 of the engine carries a gear 6 and a chain gear 7. Gear 6 drives a gear 8, carried by the central input member of variator 3, with direction reversal and slight increase in rotary speed. The variator input member comprises two discs 10 and 11, arranged back-to-back and each formed with a part-toroidal race 12. Two coordinated sets of rollers, of which single rollers 13 and 14 are shown by way of example, transmit traction from races 12 to corresponding races 15, 16 formed on the faces of output discs 17 and 18 which are carried by and rotate with an output shaft 19, from which gear 8 and discs 10, 11 are separated by a rotary bearing 20. When rollers 13, 14 change orientation in unison by pivoting as indicated by arrow 21, the rotational speed ratio transmitted from input discs 10, 11 to output discs 17 and 18, and so to output shaft 19, is changed also.

Output shaft 19 is directly connected to a central, sun-like gear 25 of epicyclic 2, and gear 7 is connected by a chain 26 to a chain gear 27 mounted on a hollow extension 28 of a member 29 which carries planet gears 30 of stepped form, comprising a larger gear 31 and a smaller gear 32. By means of the chain connection 26, the engine output shaft 5 drives member 29 without reversal, and with some speed reduction.

The large gears 31 of planets 30 mesh with central gear 25. The small gears 32 of the same planets mesh firstly with a central gear 33, the shaft 34 of which also carries a flange 35 which is engageable, by operation of a high-regime clutch 38, with CVT output shaft 1. Secondly, the smaller gears 32 mesh exteriorly with an annular gear 36 formed on a sleeve 37 which is engageable, by operation of a low regime clutch 39, with the same output shaft 1.

In high regime clutch 38 is engaged and clutch 39 disengaged. Carrier 29 is driven by engine output shaft 5 by way of chain 26, central gear 25 is rotated in the same sense by variator output shaft 19, and the smaller planet gears 32 drive the central gear 33, and so the output 1, in a manner which represents the sum of the two inputs (at 25, 29) to epicyclic 2.

In low regime clutch 38 is disengaged and clutch 39 engaged in its place. Gear 25 and carrier 29 are respectively driven by variator output shaft 19 and engine output shaft 5 as before, but now the annular gear 36 and sleeve 37 transmit drive from the radially-outer sides of smaller planet gears 32 to the output member 1. The drawing thus shows an epicyclic 2 in which two of the components—central gear 25 and "carrier" 29—are common to both regimes of CVT operation, but in which by changing over just the third component two different epicyclic ratios are achieved, for high and low regime respectively.

Calculations have been made, for one possible CVT according to the invention, using the following assumptions:

1. An overall transmission range, for the CVT, from −5 to +40 mph/1000 rpm;
2. a range for the variator 3 from 0.4:1 to 2.5:1, with a transmission range in high regime of 3.5:1;
3. the maximum output torque is 4× maximum torque at highest forward ratio;
4. maximum torque reaction of the variator takes place at geared neutral, and rises no higher in reverse;
5. the step-up in ratio from engine to variator (gears 6, 8) is −1.2:1;
6. synchronous change between low and high regimes takes place at the lowest ratio of variator 3.

On these assumptions, and with an effective ratio E of 3.65 for epicyclic 2 in low regime, and 1.1 in high regime, the following correlated values of variator ratio R, variator torque reaction $T_r$, and variator power $P_v$ have been predicated for speeds V (in mph/1000), the figures above the line representing performance in high regime and those below it performance in low regime. (The values of $T_r$ and $P_v$ are relative to the instantaneous values of engine torque and power respectively).

| V | R | $T_r$ | $P_v$ |
|---|---|---|---|
| 40 | 2.5 | 0.992 | 0.85 |
| 30 | 1.765 | 1.045 | 0.80 |
| 20 | 1.03 | 1.151 | 0.70 |
| 15 | 0.6625 | 1.257 | 0.60 |
| 11.43 | 0.4 | 1.389 | 0.476 |
| 11.43 | 0.4 | 0.799 | 0.274 |
| 10 | 0.583 | 1.032 | 0.456 |
| 5 | 1.222 | 1.449 | 0.956 |
| 0 | 1.861 | 1.865 | 1.456 |
| −5 | 2.5 | 1.865 | 1.599 |

Of particular note, in the above figures, are the relatively low values of torque reaction $T_r$ at low values of V in high regime, when typically the engine is most likely to be under hard acceleration, and where in a conventional two-regime CVT, with direct drive in high regime, the torque reaction could be expected to be approaching twice the value shown.

I claim:

1. A continuously-variable-ratio transmission (CVT) of the toroidal-race rolling-traction type, capable of operating in "low" and "high" regimes with a synchronous change between the low and high regimes, said continuously-variable-ratio transmission comprising:

a variator (3), an associated gearing set (2), and a gear controlling means for controlling components of the gearing set in different combinations for the high and low regimes, respectively, an output of the gearing set being connected to the output (1) of the CVT as a whole, and the gearing set having first (25) and second (29) inputs connected with an output of said variator (19) and an engine output (5), respectively, wherein in the low regime, the gear controlling means controls the gearing set to recirculate power and to deliver to the CVT output a power equal to the difference between the two input powers, whereas in the high regime the gear controlling means controls the gearing set to split the power flow and to deliver to the CVT output a power representing the sum of the powers at the first and second inputs.

2. A CVT according to claim 1 wherein all components (25, 29, 33, 36) of the gearing set are coaxial.

3. A CVT according to claim 2 wherein the gearing combination and variator are coaxial.

4. A CVT according to claim 1 wherein first (25) and second (29) components of the gearing set, to which the variator and engine outputs are respectively connected, intermesh with each other in epicyclic fashion.

5. A CVT according to claim 4 wherein the second component carries planet gears (30).

6. A continuously-variable-ratio transmission (CVT) of the toroidal-race rolling-traction type, capable of operating in "low" and "high" regimes with synchronous change between the low and high regimes, said CVT comprising:

a variator (3), an associated gearing set (2), and a gear controlling means for controlling the components of said gearing set (2) in different combinations for the high and low regimes, said output of said gearing set (2) being connected to an output (1) of said CVT as a whole, and said gearing set (2) having first (25) and second inputs (29) connected with an output (19) of said variator and an engine output (5), respectively, wherein, when said CVT is in the low regime, said gear controlling means adjusts said gearing set to recirculate power and to deliver to said output of said CVT a power equal to the difference between the power of said first and second inputs and, when said CVT is in the high regime, said gear controlling means adjusts said gearing set to split the power flow and to deliver to said output of said CVT a power representing the sum of the powers at said first and second inputs;

said first (25) and second inputs (29) of said gearing set intermesh with one another in an epicyclic fashion;

said second input (29) carries planet gears (30); and drive is transmitted to said output of said CVT, when said CVT is in the high regime, by way of a third component (33) meshing internally with said planet gears, and drive is transmitted to said output of said CVT, when said CVT is in the low regime, by way of a fourth component (36) meshing externally with said planet gears.

7. A CVT according to claim 6 wherein the planet gears are in the form of stepped gears presenting both a greater and a lesser radius, in which the greater radius (at 31) meshes with the first component, and in which the lesser radius (at 32) meshes with the third and fourth components.

8. A continuously-variable-ratio transmission of the toroidal-race rolling-traction type, capable of operating in low and high regimes with a synchronous change between the low and high regimes, said continuously-variable-ratio transmission comprising:

a plurality of gears forming a gear set (2) with first (25) and second (29) inputs, and said gear set (2) having an output which is an output (1) of said continuously-variable-ratio transmission;

a variator (3) having an input and an output (19), and said first input (25) of said gear set (2) being connected to receive driving power from said output (19) of said variator;

said second input (29) of said gear set (2) and said input of said variator (3) being connected to receive driving power from an output of an engine (5); and a gear control mechanism for controlling a flow of driving power through said plurality of gears of said gear set (2) in different combinations for the high and low regimes, respectively;

wherein, when said continuously-variable-ratio transmission is in the low regime, said gear control mechanism adjusts said gear set to recirculate power and to deliver, to said output of said continuously-variable-ratio transmission, a power equal to the difference between the power supplied by said first and second inputs, and, when said continuously-variable-ratio transmission is in the high regime, said gear control mechanism adjusts said gear set to split the flow of power so as to deliver to said output of said continuously-variable-ratio transmission a power representing the sum of the power of said first and second inputs.

9. A continuously-variable-ratio transmission according to claim 8, wherein said gear set is an epicyclic gear.

10. A continuously-variable-ratio transmission according to claim 8, wherein at least four of said gears of said gear set are arranged coaxial with one another.

11. A continuously-variable-ratio transmission according to claim 8, wherein said gear set and said variator are coaxial with one another.

12. A continuously-variable-ratio transmission according to claim 8, wherein said first input (25) and said second input (29) intermesh with one another in an epicyclic fashion.

13. A continuously-variable-ratio transmission according to claim 12, wherein said plurality of gears form an epicyclic gear and said second input (29) carries said planet gears (30).

14. A continuously-variable-ratio transmission according to claim 13, wherein, when said continuously-variable-ratio transmission is in the high regime, driving power is transmitted to said output of said continuously-variable-ratio transmission by way of an third gear (33) meshing internally with said planet gears (30) and, when the continuously-variable-ration transmission is in the low regime, power is transmitted to said output of said continuously-variable-ratio transmission by way of a fourth gear (36) meshing externally with said planet gears (30).

15. A continuously-velocity-ratio transmission according to claim 14, wherein said planet gears (30) are in the form of step gears which have different radiuses, and the step gears with the smallest radius mesh with both said third gear (33) and said fourth gear (36) while said step gears with the largest radius mesh with said first input (25).

16. A continuously-variable-ratio transmission according to claim 14, wherein said gear control mechanism comprises a pair of clutches, and one of said pair of clutches cooperates with said third gear (33) while the other of said pair of clutches cooperates with said fourth gear (36).

* * * * *